US006801248B1

(12) United States Patent
Horiuchi

(10) Patent No.: US 6,801,248 B1
(45) Date of Patent: Oct. 5, 2004

(54) IMAGE PICK-UP DEVICE AND RECORD MEDIUM HAVING RECORDED THEREON COMPUTER READABLE PROGRAM FOR CONTROLLING THE IMAGE PICK-UP DEVICE

(75) Inventor: Kazuhito Horiuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/358,538

(22) Filed: Jul. 22, 1999

(30) Foreign Application Priority Data

Jul. 24, 1998 (JP) .......................................... 10-209450

(51) Int. Cl.⁷ ............................................. H04N 5/228
(52) U.S. Cl. ................. 348/208.13; 348/362; 348/155; 358/450; 358/453
(58) Field of Search .......................... 348/221.1, 229.1, 348/362–364, 154, 155, 208.12–208.14; 358/448, 450, 452, 453, 909.1, 474, 475, 482, 483; 382/284

(56) References Cited

U.S. PATENT DOCUMENTS

| 5,309,243 A | | 5/1994 | Tsai ........................ 348/221.1 |
| 5,365,269 A | * | 11/1994 | Holmes et al. ............. 348/297 |
| 6,002,433 A | * | 12/1999 | Watanabe et al. ........... 348/246 |
| 6,204,881 B1 | * | 3/2001 | Ikeda et al. ................. 348/362 |
| 6,278,490 B1 | * | 8/2001 | Fukuda et al. .............. 348/362 |
| 6,529,640 B1 | * | 3/2003 | Utagawa et al. ............ 382/284 |
| 2002/0154829 A1 | * | 10/2002 | Tsukioka .................... 382/254 |

FOREIGN PATENT DOCUMENTS

JP          1166279        9/1999

OTHER PUBLICATIONS

European Search Report dated Nov. 17, 1999 (Computer Nov. 19, 1999).

Patent Abstracts of Japan, vol. 015, No. 050 (E–1030), Feb. 6, 1991 & JP 02 280585 A (Olympus Optical Co., Ltd.), Nov. 16, 1990.

* cited by examiner

*Primary Examiner*—Andrew Christensen
*Assistant Examiner*—Dorothy Wu
(74) *Attorney, Agent, or Firm*—Stevens, Davis, Miller & Mosher, LLP

(57) ABSTRACT

An image pick-up device for producing a synthesized image signal having a wide dynamic range by partially exchanging a plurality of image signals from a solid state image sensing element in an image synthesizing unit (41), said image signals being obtained by picking-up a subject moving on a bright background with different exposure amounts, including a synthetic unsuitable portion detecting unit (42, 44) for detecting a synthetic unsuitable portion by comparing said plurality of image signals picked-up with different exposure amounts, a synthetic unsuitable portion correcting unit (46, 48) for correcting a pixel signal of said synthesizing unsuitable portion to derived a corrected synthesized image signal, and a low pass filter (47) for combining said corrected synthesized image signal from said synthetic unsuitable portion correcting unit with said synthesized image signal from said image synthesizing unit to derive a corrected synthesized image signal. An image obtained from the corrected synthesized image signal is not influenced by the movement of the subject and does not cause any feeling of strangeness as compared with a conventional photographic image.

15 Claims, 13 Drawing Sheets

FIG_12

IMAGE PICK-UP DEVICE AND RECORD MEDIUM HAVING RECORDED THEREON COMPUTER READABLE PROGRAM FOR CONTROLLING THE IMAGE PICK-UP DEVICE

BACKGROUND OF THE INVENTION

1. Field of the Invention

The present invention relates to an image pick-up device such as electronic still camera and digital camera including a solid state image sensing element, and more particularly to an image pick-up device which can produce an image signal having a wider dynamic range than that of a solid state image sensing element. The present invention also relates to a record medium having recorded thereon a computer readable program for controlling an imaging operation of the above mentioned image pick-up device.

2. Description of the Related Art

In the image pick-up device of the kind mentioned above, since the solid state image sensing element has a relatively narrow dynamic range compared with a conventional photographic film, when a subject situating on a relatively bright background is to be picked-up under such an exposure time that the subject is picked-up with a proper exposure amount, the background might be picked-up with an overexposure amount and an image signal corresponding to the background might be saturated. On the other hand, when the subject is picked-up under such an exposure time that the bright background is picked-up with a proper exposure amount, the subject might be picked-up with an underexposure amount and might become too dark. In order to increase a dynamic range of the solid state image sensing element, it has been proposed a known image pick-up device, in which an object is picked-up twice with different exposure amounts, and the thus obtained two image signals are synthesized by simply adding these image signals each other or by partially exchanging or combining these image signals in a mosaic fashion.

In the former solution in which the two image signals obtained with different exposure amounts are synthesized by simply adding them, when a subject moves or a camera moves to produce a relative positional shift between successively picked-up two image signals, S/N is decreased at a portion which is subjected to the movement and pseudo-color or pseudo-edge might be produced in a synthesized image signal.

In order to remove such a problem, in Japanese Patent Application Laid-open Publication Kokai Hei 2-280585, it has been proposed to derive a synthesized image signal in such a manner that a difference between the two image signals is derived and an absolute value of said difference is subtracted from the synthesized image signal obtained by merely adding the two image signals. However, in this case, since the image shift portion in the synthesized image signal is removed by the subtractive correction, when a subject moves, a configuration of the subject within a synthesized image might be deformed, and therefore the synthesized image has a feeling of strangeness as compared with an image formed on a conventional photographic film.

The above problem also occurs in the later solution, in which the two image signals are synthesized by combining or exchanging them in a mosaic fashion. That is to say, as shown in FIG. 13, when a too bright portion B (e.g. background) in a first image A picked-up with a large exposure amount is replaced by a corresponding portion D in a second image C picked-up with a small exposure amount after adjusting a gain of said portion D to derive a synthesized image E, if a subject F moves from right to left in FIG. 13 during a time interval between successive image picking-up operations, a part of the subject F in the second image C picked-up with small exposure amount corresponding to the movement is also synthesized as a part G in the synthesized image E. Then, the subject is partially seen double, and therefore a feeling of strangeness remains.

SUMMARY OF THE INVENTION

A first object of the present invention is to provide a novel and useful image pick-up device, in which a synthesized image having a wider dynamic range than that of a solid state image sensing element can be obtained by partially combining or exchanging a plurality of images picked-up with different exposure amounts in a mosaic fashion, while said synthesized image be seen without causing a feeling of strangeness.

A second object of the invention is to provide a record medium having recorded thereon a computer readable program which is to make a computer to execute procedures for controlling the image pick-up device in such a manner that a synthesized image with a wider dynamic range than that of a solid state image sensing element can be seen without causing a feeling of strangeness.

According to the invention for attaining the above mentioned first object, an image pick-up device for producing a synthesized image signal having a wide dynamic range by partially combining a plurality of images picked-up with different exposure amounts comprises:

an image picking-up means including a solid state image sensing element and picking-up an object by a plurality of times with different exposure amounts to derive a plurality of image signals;

a memory means for storing at least a part of said plurality of image signals derived successively from said image picking-up means;

an image synthesizing means for synthesizing said plurality of image signals a part of which is read out of said memory means to derive a synthesized image signal;

a detecting means for detecting a synthetic unsuitable portion in said plurality of image signals which is not suitable for synthesizing in accordance with a comparison of the plurality of image signals;

a correcting means for correcting pixel signals of said synthetic unsuitable portion detected by said detecting means to derive a corrected pixel signal; and a combining means for combining said corrected pixel signal from said correcting means with said synthesized image signal from said synthesizing means to derive a corrected synthesized image signal.

In the image pick-up device according to the invention, a synthetic unsuitable portion is detected on the basis of a comparison of a plurality of image signals picked-up with different exposure amounts, and the pixel signal of the thus detected synthetic unsuitable portion is corrected. Therefore, even if a subject moves on a bright background during successive image picking-up operations, it is possible to minimize any undesired synthesis due to the movement of the subject, and thus a corrected synthesized image having a wide dynamic range can be obtained without causing a feeling of strangeness upon comparing with the conventional photographic film.

In an embodiment of the image pick-up device according to the invention, said synthetic unsuitable portion detecting means is constructed such that a ratio in level between a plurality of image signals picked-up with different exposure amounts is calculated, and a synthetic unsuitable portion is detected on the basis of a comparison of said ratio with a ratio in exposure amounts with which said plurality of image signals are picked-up. In this case, a synthetic unsuitable portion can be detected by a simple comparing operation using the plurality of image signals picked-up with different exposure amounts and data from a hardware controlling an exposing operation. Therefore, a cost can be reduced and an operation time can be shortened.

In another embodiment of the image pick-up device according to the invention, said synthetic unsuitable portion detecting means is constructed such that a difference between a plurality of image signals picked-up with different exposure amounts is calculated, and a synthetic unsuitable portion is detected on the basis of said difference. Also in this case, a synthetic unsuitable portion can be detected by a simple comparing operation using the plurality of image signals taken with different exposure amounts and data from a hardware controlling an exposing operation, and therefore a cost can be reduced and an operation time can be shortened.

In an embodiment of the image pick-up device according to the invention, said synthetic unsuitable portion detecting means is constructed such that a motional vector is calculated on the basis of a comparison of the plurality of image signals picked-up with different exposure amounts, and a synthetic unsuitable portion is detected on the basis of a magnitude of said motional vector. In this embodiment, since a moving amount and a moving direction of a subject can be derived, it is possible to detect the synthetic unsuitable portion much more precisely.

In an embodiment of the image pick-up device according to the invention, said synthetic unsuitable portion detecting means is constructed such that a difference between said plurality of image signals picked-up with different exposure amounts is calculated, a motional vector is derived on the basis of a comparison between said plurality of image signals only for a pixel region in which an absolute value of said difference is not less than a predetermined value, and a synthetic unsuitable portion is detected on the basis of a magnitude of said motional vector. When a synthetic unsuitable portion is detected by calculating a motional vector only for a pixel region in which an absolute value of a difference between a plurality of image signals picked-up with different exposure amounts in the manner mentioned above, the operation time of detecting a synthetic unsuitable portion can be materially shortened.

In an embodiment of the image pick-up device according to the invention, said synthetic unsuitable portion correcting means is constructed such that a pixel signal within a synthetic unsuitable portion is corrected in accordance with a synthesized pixel signal of a portion which situates in a portion which is not detected as the synthetic unsuitable portion, but is in a vicinity of the synthetic unsuitable portion. When the pixel signal within the synthetic unsuitable portion is corrected in accordance with the synthesized pixel signal of a portion which situates near the synthetic unsuitable portion, it is possible to obtain a corrected synthesized image signal which does not produce a feeling of strangeness with respect to surroundings of the subject as well as a whole synthesized image signal.

In another embodiment of the image pick-up device according to the invention, said synthetic unsuitable portion detecting means is constructed to detect a synthetic unsuitable portion on the basis of the motional vector, and said synthetic unsuitable portion correcting means is constructed such that a pixel signal in the synthetic unsuitable portion including a start point of the motional vector is corrected by a synthesized pixel signal in a portion including an end point of said motional vector and being excluded from said synthetic unsuitable portion, and a pixel signal of the synthetic unsuitable portion in a remaining region within the pixel block including the end point of the motional vector is corrected in accordance with an image signal of a corresponding region of one of said plurality of image signals. In this manner, when the pixel signal in the synthetic unsuitable portion including the start point of the motional vector is corrected by the synthesized pixel signal in the pixel block including the end point of said motional vector and being excluded from said synthetic unsuitable portion, the pixel signal in the synthetic unsuitable portion including the start point of the motional vector can be corrected using a lot of pixels without the synthetic suitable portion. Therefore, the precision of the correction can be improved, and it is possible to attain a corrected synthesized image which does not cause a feeling of strangeness with respect to a whole image.

In an embodiment of the image pick-up device according to the invention, said synthetic unsuitable portion detecting means is constructed such that a synthetic unsuitable portion is detected by calculating a motional vector, and said synthetic unsuitable portion correcting means is constructed such that a pixel signal of the synthetic unsuitable portion within a pixel block which has a center at a start point of said motional vector and contains an end point of said motional vector is corrected in accordance with a synthesized image signal of a synthetic suitable portion within a pixel block which has a center at the end point of said motional vector and has a same size as said pixel block having a center at the start point of the motional vector. Then, it is no more necessary for correcting the pixel signal of the synthetic unsuitable portion to perform a calculation at a pixel unit, and thus the structure can be simplified and the operating time can be shortened.

In order to achieve the second object of the invention, a computer readable record medium, having a program recorded thereon, wherein said program is to make a computer execute the following procedures for controlling an operation of an image pick-up device having a solid state image sensing element:

to derive a plurality of image signals with different exposure amounts from said solid state image sensing element;

to detect a synthetic unsuitable portion on the basis of a comparison of said plurality of image signals;

to correct a pixel signal of said detected synthetic unsuitable portion to produce a corrected pixel signal;

to synthesize said plurality of image signals with each other except for said synthetic unsuitable portion to derive a synthesized image signal; and to combine said synthesized image signal with said corrected pixel signal of the synthetic unsuitable portion to derive a corrected synthesized image signal having a dynamic range which is wider than that of said solid state image sensing element.

DESCRIPTION OF THE PREFERRED EMBODIMENT

Figure 1:
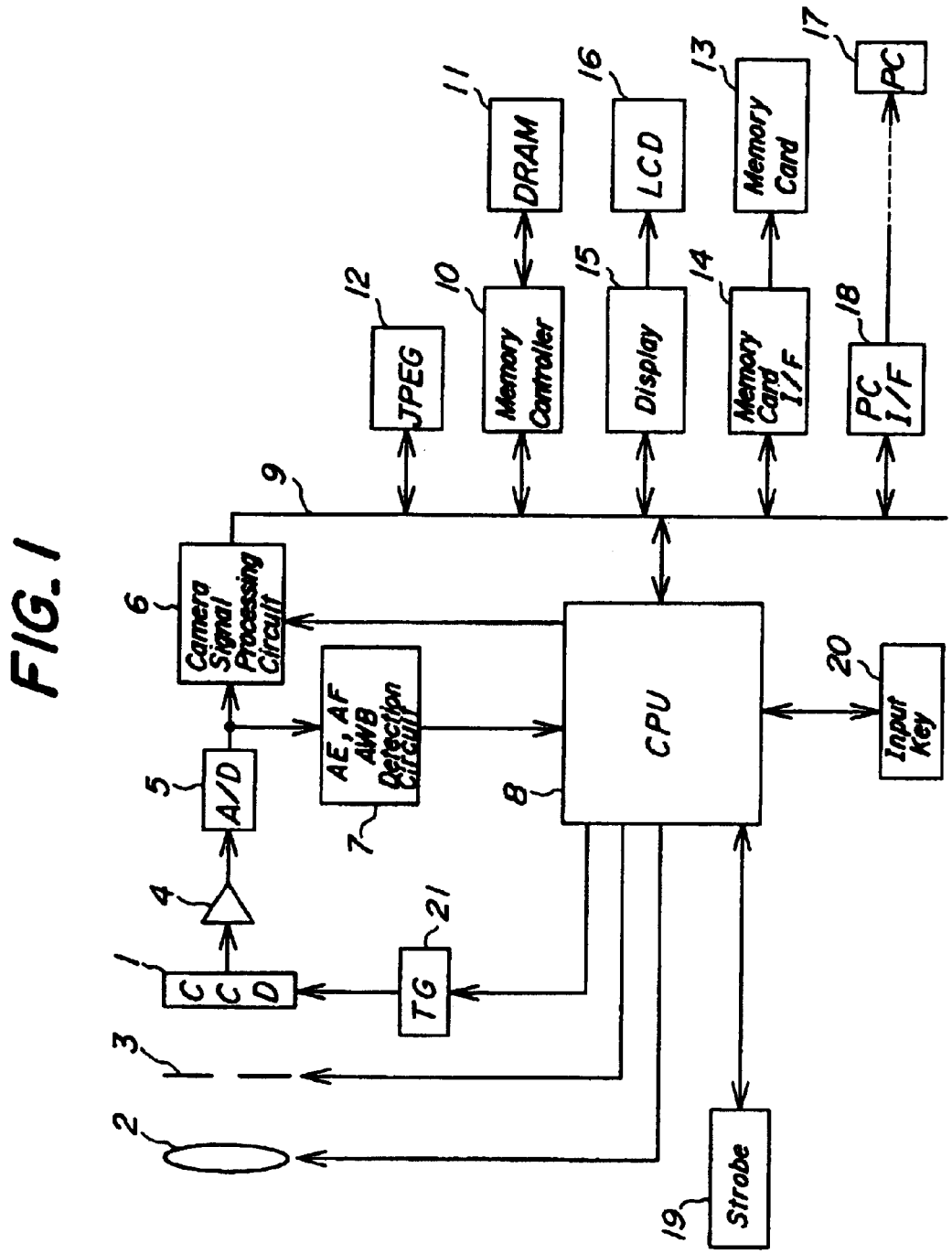
FIG. 1 is a block diagram showing a principal structure of the image pick-up device according to the invention.

FIG. 1 is a block diagram showing a principal structure of the image pick-up device according to the invention which is constructed as an electronic still camera. The electronic still camera comprises a single plate type color CCD image sensing element 1 having an electronic shutter function. On to the CCD image sensing element 1 is projected an image of an object by means of a lens unit 2 and a stop-shutter mechanism 3. The object image is then photoelectrically converted into an image signal. After removing noise in the image signal by means of a correlation double sampling circuit not shown, the image signal is amplified by an amplifier 4 and is converted into a digital signal by an A/D converter 5. Then, the thus obtained digital image data is supplied to a camera signal processing circuit 6 and is processed thereby.

The output signal of the A/D converter 5 is also supplied to an AF, AE, AWB detection circuit 7, in which an AF detection processing for deriving AF information for automatically controlling a focus condition, an AE processing for deriving AE information for automatically controlling an exposure, and an AWB processing for deriving AWB information for automatically controlling a white balance. The AF information, AE information and AWB information are supplied to the lens unit 2, stop-shutter mechanism 3 and camera signal processing circuit 6, respectively through CPU 8.

The camera signal processing circuit 6 and CPU 8 are connected to a bus line 9, to which are also connected a DRAM 11 through a memory controller 10, said DRAM being used as a working memory upon processing color of the image data, and an image compressing circuit (JPEG) 12 for compressing the image data supplied from the camera signal processing circuit 6. To the bus line 9, there are further connected a memory card I/F 14 for storing a compressed image signal data into a memory card 13, a liquid crystal display (LCD) 16 via a display circuit 15, and a PC I/F 18 for transferring the image data stored in the memory card 13 to a personal computer (PC) 17. Said LCD 16 displays an image stored in the memory card 13 and various image picking-up conditions.

To the CPU 8 are connected a strobe flash 19 which is controlled in accordance with the AE information supplied from the AF, AE and AWB detection circuit 7, and an input key 20 for setting various image pick-up modes and driving a trigger switch. The CCD image sensing element 1 is driven by a timing pulse from a timing generator (TG) 21 under the control of the CPU 8.

In the image pick-up device shown in FIG. 1, any one of a normal pick-up mode without image synthesis and a wide dynamic range pick-up mode with image synthesis can be selected manually or can be automatically selected by detecting a too bright portion (white large area) in an image signal from the CCD image sensing element 1 under the control of the CPU 8. When the normal pick-up mode is selected, an image signal corresponding to a single picture is derived from the CCD image sensing element 1 by a single picking-up operation. When the wide dynamic mode is selected, the object image is repeatedly picked-up by the CCD element 1 with different exposure amounts to derive a plurality of image signals corresponding to a plurality of pictures by a single picking-up operation. This may be carried out in a known manner by the electronic shutter function of the CCD image sensing element 1 or the stop-shutter mechanism 3 or a combination of the electronic shutter function of the CCD image sensing element 1 and the stop-shutter mechanism 3. Here, for the sake of explanation, the CCD image sensing element 1 produces successively two image signals with different exposure amounts by a single image picking-up operation. The thus obtained single image signal or plural image signals are processed by the camera signal processing circuit 6 in accordance with the selected pick-up mode.

Figure 2:
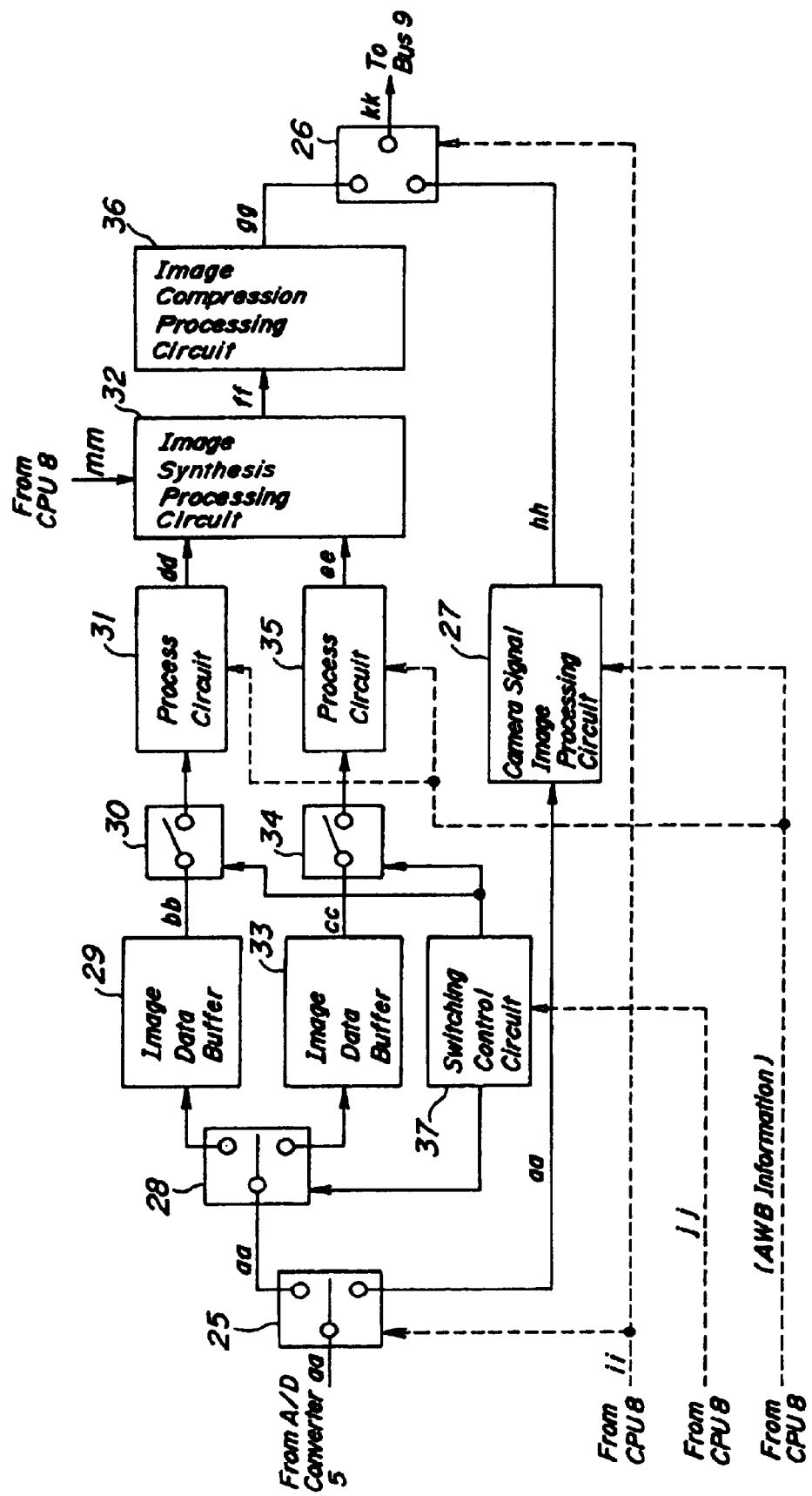
FIG. 2 is a block diagram illustrating a camera signal processing circuit shown in FIG. 1.

FIG. 2 is a block diagram illustrating an embodiment of the camera signal processing circuit 6 shown in FIG. 1. The camera signal processing circuit 6 comprises an input side exchange switch 25 and an output side exchange switch 26. One contact of the input side exchange switch 25 is connected to one contact of the output side exchange switch 26 by means of a camera signal image processing circuit 27. The other contact of the input side exchange switch 25 is connected to a switching arm of an image exchange switch 28, whose one contact is connected to one input of an image synthesis processing circuit 32 via image buffer 29, on-off switch 30 and process circuit 31. The other contact of the image exchange switch 28 is connected to the other input of the image synthesis processing circuit 32 through image buffer 33, on-off switch 34 and process circuit 35. An output of the image synthesis processing circuit 32 is connected to an input of an image compression processing circuit 36, whose output is connected to the other input of the output side exchange switch 26.

The input and output side exchange switches 25 and 26 are controlled by a pick-up mode signal ii from the CPU 8, and the image exchange switch 28 and on-off switches 30 and 34 are controlled by an image synthesis process control signal jj from the CPU 8 via a switching control circuit 37. When the wide dynamic range pick-up mode is selected, the CPU 8 supplies, to the image synthesis processing circuit 32, a data signal representing a ratio of exposure amounts with which the object is pick-up successively.

In the normal pick-up mode, the input and output side exchange switches 25 and 26 are set to the position of the camera signal image processing circuit 27 by the pick-up mode signal ii. Then, the image signal aa from the A/D converter 5 is supplied to the camera signal image processing circuit 27 by means of the input side exchange switch 25, and is subjected to conventional image processes such as AWB process in accordance with the AWB information from the CPU 8, interpolating process for color information on the basis of a color filter structure of the CCD image sensing element 1, and contrast enhancing process. Then, an image signal hh thus processed is supplied to the bus line 9 as a final image signal kk through the output side exchange switch 26.

Contrary to this, when the wide dynamic range pick-up mode is selected, the input side exchange switch 25 is connected to the image exchange switch 28 and at the same time, the output side exchange switch 26 is connected to the image compression processing circuit 36 under the control of the pick-up mode signal ii from the CPU 8. The image exchange switch 28 and on-off switches 30, 34 are controlled by the image synthesis process control signal jj supplied from the CPU 8 via the switching control circuit 37, such that two image signals picked-up with different exposure amounts are successively stored in the image data buffers 29 and 33, respectively.

That is to say, at first the on-off switches 30 and 34 are set to the open-state, and the image exchange switch 28 is driven in synchronism with the image picking-up operations for driving the two image signals picked-up with different exposure amounts, such that the image signal aa picked-up with a smaller exposure amount is stored in the image data buffer 29 and the image signal aa picked-up with a larger exposure amount is stored in the image data buffer 33. After that, the on-off switches 30, 34 are simultaneously driven into the closed-condition, an image signal bb picked-up with a smaller exposure amount is supplied from the image data buffer 29 to the process circuit 31 through the on-off switch 30 and an image signal cc picked-up with a larger exposure amount is supplied from the image data buffer 33 to the process circuit 35 through the on-off switch 34.

In the process circuits 31 and 35, the image signals are subjected to similar image processes to those of the camera signal image processing circuit 27. An image signal dd picked-up with a smaller exposure amount and an image signal ee picked-up with a larger exposure amount are supplied to the image synthesis processing circuit 32 in synchronism with each other. The image synthesis processing circuit 32 compose the image signals dd and ee by partially exchanging these image signals in accordance with the exposure amount ratio signal mm from the CPU 8 to derive a synthesized image signal ff having a wider dynamic range than the image signals dd and ee. The thus obtained synthesized image signal ff is supplied to the image compression processing circuit 36, in which the synthesized image signal ff is compressed such that the dynamic range is matched with a proper exposure level to derive a compressed synthesized image signal gg. This compressed synthesized image signal gg is supplied to the bus line 9 by means of the output side exchange switch as a final output image signal kk.

In the embodiment shown in FIG. 2, there are provided two sets of the image data buffers 29, 33 and on-off switches 30, 34, but according to the invention, the image data buffer 33 and on-off switch 34 may be dispensed with. In such a case, after storing the image signal aa picked-up with a smaller exposure amount into the image data buffer 29, the on-off switch 30 is closed in synchronism with the switching operation of the image exchange switch 28 such that the image signal bb picked-up with a smaller exposure amount from the image data buffer 29 and the image signal aa picked-up with a larger exposure amount from the A/D converter 5 may be supplied to the process circuits 31 and 35, respectively in a synchronous manner.

In a first embodiment of the image pick-up device according to the invention, in the image synthesis processing circuit 32, upon synthesizing the image signals dd, ee picked-up with different exposure amounts with each other, a ratio of level between these image signals is calculated pixel by pixel, and when the calculated level ratio is equal to or larger than the exposure amount ratio data signal mm from the CPU 8 by a predetermined value, a relevant pixel is judged to be a synthetic unsuitable pixel, and this pixel is corrected by performing interpolation with the synthesized image signal of a pixel which is in a vicinity of the relevant synthetic unsuitable pixel, but is not detected as a synthetic unsuitable pixel.

Figure 3:
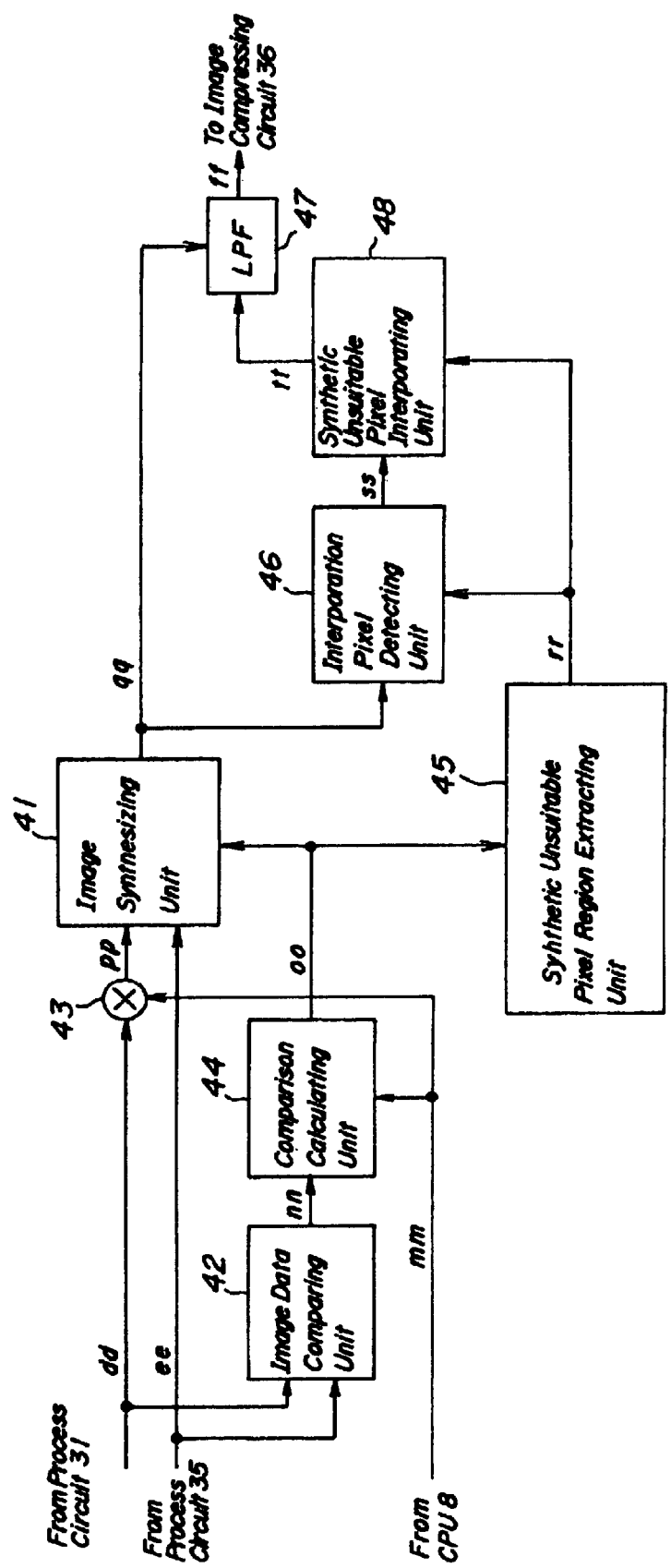
FIG. 3 is a block diagram depicting an image synthesizing circuit shown in FIG. 2 of a first embodiment of the image pick-up device according to the invention.

FIG. 3 is a block diagram depicting an embodiment of the image synthesis processing circuit 32 of the first embodiment. In this image synthesis processing circuit 32, the image signal ee picked-up with a larger exposure amount is supplied to one input of an image synthesizing unit 41 as well as to one input of an image data comparing unit 42. The image signal dd picked-up with a smaller exposure amount is supplied to the other input of the image data comparing unit 42 as well as to a multiplier 43. In the multiplier 43, a gain of the image signal dd is adjusted by an amount corresponding to the exposure amount ratio on the basis of the exposure amount ratio data signal mm from the CPU 8. Then the thus adjusted image signal pp picked-up a smaller exposure amount is supplied to the other input of the image synthesizing unit 41.

In the image data comparing unit 42, the level ratio of the image signals dd and ee are compared with each other pixel by pixel to derive an image data comparison signal nn. The thus derived signal nn is supplied to a comparison calculating unit 44. In this comparison calculating unit 44, the image data comparison signal nn is compared with a reference value defined by the exposure ratio data signal mm from the CPU 8 to derive a comparison result logic data signal oo, which is supplied to the image synthesizing unit 41 and an synthetic unsuitable pixel region extracting unit 45. In this embodiment, the comparison result logic data signal oo is a logic "1", when the image data comparison signal nn of a pixel is larger than the reference value and the relevant pixel is judged to be the synthetic unsuitable pixel. When the image data comparison signal nn is less than the reference value, the comparison result logic data signal oo is a logic "0".

Figure 13:
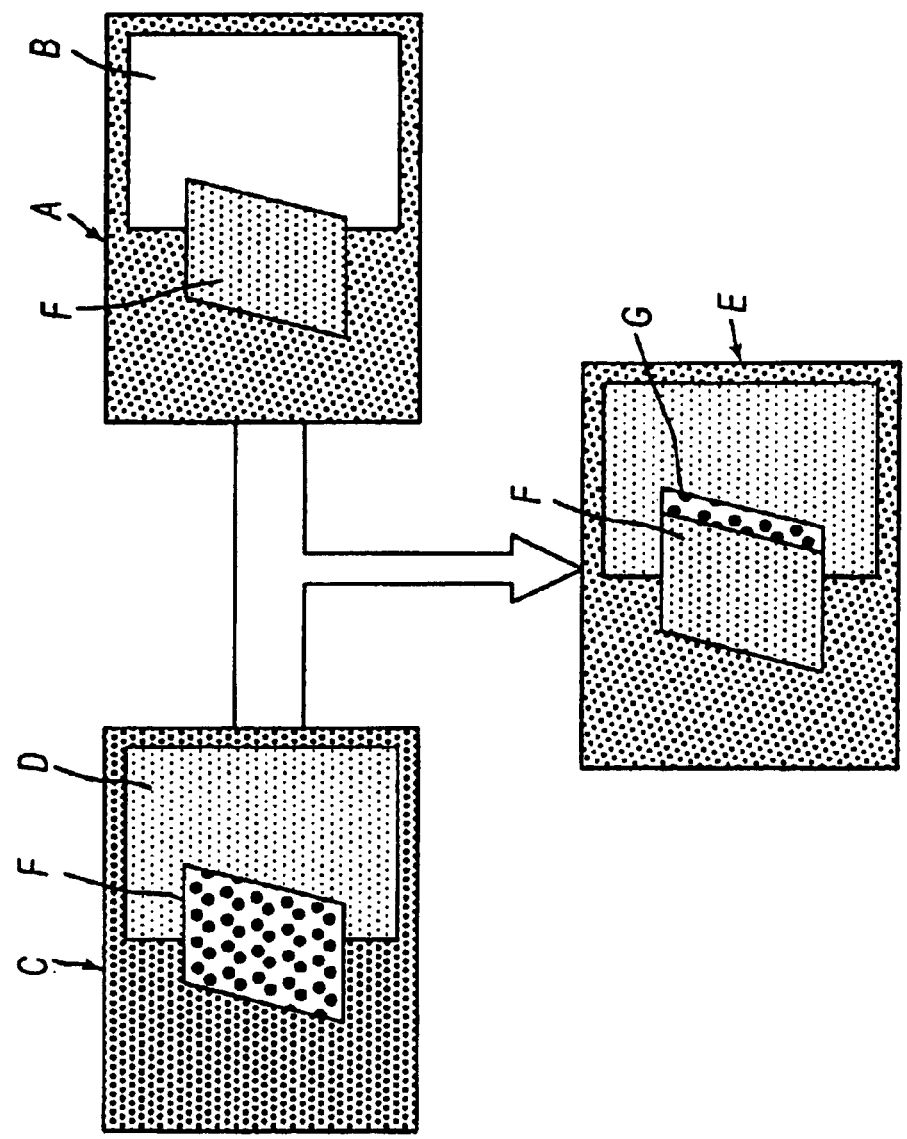
FIG. 13 is a schematic view showing the known method of deriving a synthesized image signal having a wide dynamic range by partially combining two image signals picked-up with different exposure amounts.

In the image synthesizing unit 41, when the comparison result data logic signal oo of a pixel is "0", i.e. the relevant pixel belongs to the synthetic suitable pixel, the gain adjusted image signal pp picked-up with a smaller exposure amount and the image signal ee picked-up with a larger exposure amount are synthesized as explained above with reference to FIG. 13. When the comparison result data logic signal oo of a relevant pixel is "1", i.e. the relevant pixel is judged to be the synthetic unsuitable pixel, the relevant pixel is not used in the image synthesis. Then, the image synthesizing unit 41 supplies a synthesized image signal qq in which synthetic unsuitable pixels are not synthesized. The thus obtained synthesized image signal qq is supplied to an interpolation pixel detecting unit 46 and a low pass filter (LPF) 47.

In the synthetic unsuitable pixel region extracting unit 45, a synthetic unsuitable pixel region is extracted for respective lines (horizontal direction) on the basis of the logic value of the comparison result logic data signal oo, i.e. a region in which logic "1" continues, to derive a region signal rr, which is supplied to the interpolation pixel detecting unit 46 and synthetic unsuitable pixel interpolating unit 48. In the interpolation pixel detecting unit 46, an interpolation pixel (correction reference pixel) for interpolating a pixel signal of the synthetic unsuitable pixel region in accordance with the synthesized image signal qq from the image synthesizing unit 41 and the region signal rr from the synthetic unsuitable pixel region extracting unit 45 to derive a correction reference pixel signal ss (including the information of the synthesized image signal qq). The thus derived correction reference pixel signal ss is supplied to a synthetic unsuitable pixel interpolating unit 48.

In the synthetic unsuitable pixel interpolating unit 48, a pixel signal of the synthetic unsuitable pixels corresponding to the region signal rr from the synthetic unsuitable pixel region extracting unit 45 is corrected by the interpolation on the basis of the correction reference pixel signal ss from the interpolation pixel detecting unit 46 to derive an interpolated synthesized correct pixel signal tt, which is then supplied to the low pass filter 47. In the low pass filter 47, the synthesized correct pixel signal tt is subjected to the low pass filtering treatment at least in the vertical direction by means of the synthesized image signal qq from the image synthesizing unit 41 to derive a synthesized image signal which is supplied to the image compression processing circuit 36 shown in FIG. 2 as the synthesized image signal ff.

Figure 4:
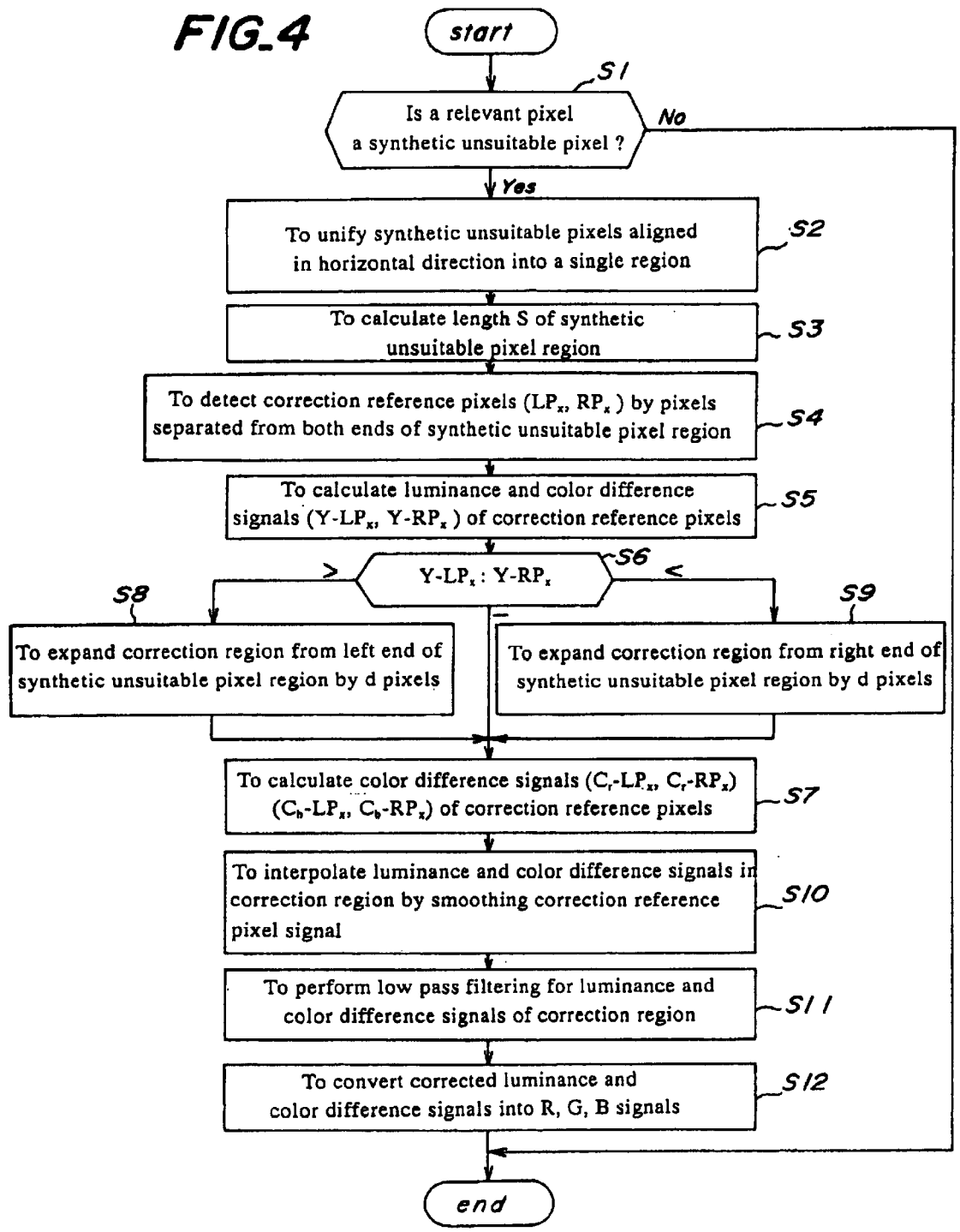
FIG. 4 is a flow chart representing an operation of major parts of the first embodiment.

FIG. 4 is a flow chart representing the correcting operation for the synthetic unsuitable pixel by means of the synthetic unsuitable pixel region extracting unit 45, interpolation pixel detecting unit 46, synthetic unsuitable pixel interpolating unit 48 and low pass filter 47 shown in FIG. 3. At first, the synthetic unsuitable pixel region extracting unit 45 judges whether or not a reference pixel belongs to the comparison unsuitable pixel on the basis of the comparison result logic data signal oo from the comparison calculating unit 44 (step S1). When the pixel is judged as the synthetic unsuitable one, i.e. logic "1", a plurality of synthetic unsuitable pixels aligned in the horizontal direction are unified into a single region (step S2), and a length (S) of this synthetic unsuitable pixel region (step S3). The synthetic unsuitable pixels defined by this length constitutes the region signal rr.

After that, in the interpolation pixel extracting unit 46, pixels situating at positions which are separated from respective ends of the synthetic unsuitable pixel region by a distance S×β (here, β is an arbitrary adjusting parameter; β>0) are detected as correction reference pixels (LPx, RPx) in a step S4. Then, luminance signals (Y-LPx, Y-RPx) of the thus detected correction reference pixels are calculated in a step S5, and the thus calculated luminance signals are compared with each other in a step S6. When Y-LPx=Y-RPx, color difference signals (Cr-LPx, Cr-RPx) are calculated in a step S7. When Y-LPx>Y-RPx, after a correction region is expanded from the left end of the synthetic unsuitable pixel region by d pixels (d≦S×β) in a step S8, the treatment in the step S7 is executed. When Y-LPx<Y-RPx, after a correction region is expanded from the right end of the synthetic unsuitable pixel region by d pixels in a step S9, the treatment in the step S7 is executed.

In the synthetic unsuitable pixel interpolating unit 48, the pixel signal within the correction region (synthetic unsuitable pixel region + expanded portion) is interpolated in accordance with the correction reference pixel signal by smoothing the pixel signal for respective luminance signal and color difference signal (step S10). After completing the interpolation for all the correction region, the luminance and color difference signals of the correction region are subjected to the low pass filtering treatment (step S11). Then, the interpolated luminance and color difference signals are converted into RGB signals (step S12), and the thus converted signals are supplied as the synthesized image signal ff.

In the first embodiment, the synthetic unsuitable pixel region is calculated and corrected only in the horizontal direction. According to the invention, the synthetic unsuitable pixel region may be also calculated in the vertical direction, and the pixel signal of this region may be corrected in both the horizontal and vertical directions in accordance with the correction reference pixel signal. Then, the low pass filtering treatment may be conducted in a two-dimensional manner in the horizontal and vertical directions. In this case, it is possible to obtain the synthesized image from which a feeling of strangeness is removed much more effectively with respect to the surroundings and whole synthesized image.

Furthermore, in the first embodiment, the synthetic unsuitable region is corrected pixel by pixel, but according to the invention, the synthetic unsuitable region may be detected and corrected for a block including a given number of pixels.

In a second embodiment of the image pick-up device according to the invention, in the image synthesis processing circuit 32 shown in FIG. 2, upon synthesizing the image signals dd and ee picked-up with different exposure amounts, a vector representing a movement of a subject (here this vector is called motional vector) is calculated by comparing these image signals. When the motional vector of pixels exceeds a predetermined value, the relevant pixels are detected as the synthetic unsuitable pixel. Then, a pixel signal at a start point of the motional vector is corrected by performing the interpolation in accordance with a synthesized image signal of a synthetic suitable part within a small block including an end point of the motional vector, and a pixel signal of the remaining synthetic unsuitable region within the small block including the end point of the motional vector is corrected by conducting the interpolation in accordance with a pixel signal of a corresponding region of the image signal dd.

Figure 5:
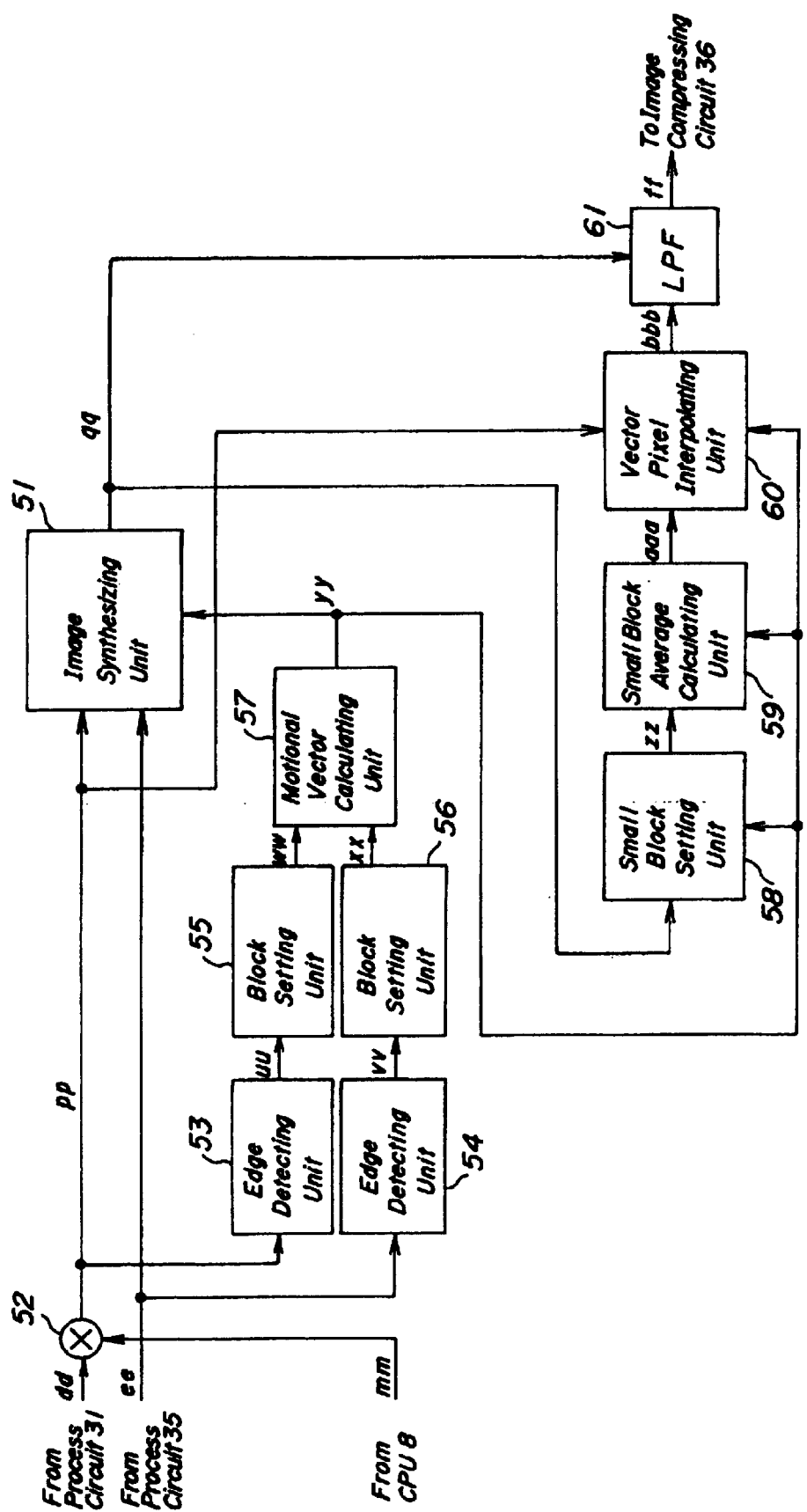
FIG. 5 is a block diagram showing an embodiment of the image synthesizing circuit shown in FIG. 2 in a second embodiment of the image pick-up device according to the invention.

FIG. 5 is a block diagram showing an embodiment of the image synthesis processing circuit 32 in the second embodiment of the image pick-up device according to the invention. In this image synthesis processing circuit 32, the image signal ee picked-up with a larger exposure amount is supplied to one input of an image synthesizing unit 51. The image signal dd picked-up with a smaller exposure amount is supplied to a multiplier 52, in which a gain of the image signal is adjusted on the basis of the exposure amount ratio data signal mm from the CPU 8 by an amount corresponding to the exposure amount ratio. Then, the amplified image signal pp is supplied to the other input of the image synthesizing unit 51. The image signals pp and ee are supplied to edge detecting units 53 and 54, respectively to derive edge detection signals uu and vv. These edge detection signals are supplied to block setting units 55 and 56, respectively to derive block signals ww and xx, which are supplied to a motional vector calculating unit 57. In the motional vector calculating unit 57, a motional vector representing the movement of the subject is calculated in accordance with the block signals ww and xx to derive a motional vector data signal yy. The thus derived motional vector data signal yy is supplied to the image synthesizing unit 51, small block setting unit 58, small block average calculating unit 59 and vector pixel interpolating unit 60.

In the image synthesizing unit 51, the motional vector data signal yy is compared with a predetermined threshold value. When the motional vector data signal yy is less than the threshold value, a relevant pixel is judged as a synthetic suitable pixel and a pixel signal of the gain adjusted image signal pp picked-up with a smaller exposure amount and a corresponding pixel signal of the image signal ee picked-up with a larger exposure amount are synthesized by the partial exchanging in the manner explained with reference to FIG. 13. When, the motional vector data signal yy is larger than the threshold value, a pixel is judged as a synthetic unsuitable pixel and the image synthesis by the partial exchange is not executed. In this manner, the image synthesizing unit 51 produce the synthesized image signal qq in which pixels except for the synthetic unsuitable pixels are synthesized. The thus derived image synthesized signal qq is supplied to the small block setting unit 58 and low pass filter (LPF) 61.

In the small block setting unit 58, a magnitude of the motional vector data signal yy having a start point of a relevant pixel is compared with a predetermined threshold value. Only when the motional vector data signal yy exceeds the threshold value, the relevant pixel is judged as a synthetic unsuitable pixel. Then, as illustrated by (A) in FIG. 6, a small block (here 3×3 pixel block) is set from the synthesized image signal qq such that a center of the block corresponds to the end point of the motional vector to derive a small block set signal zz. This signal zz (including the information of the synthesized image signal qq) is then supplied to the small block average calculating unit 59, in which average values (Rv, Gv, Bv) of respective color signals by using the synthesized image signal within the small block as shown by (B) in FIG. 6. Then, a small block average value signal aaa (including the information of the synthesized image signal qq) is supplied to the vector pixel interpolating unit 60.

Figure 6:
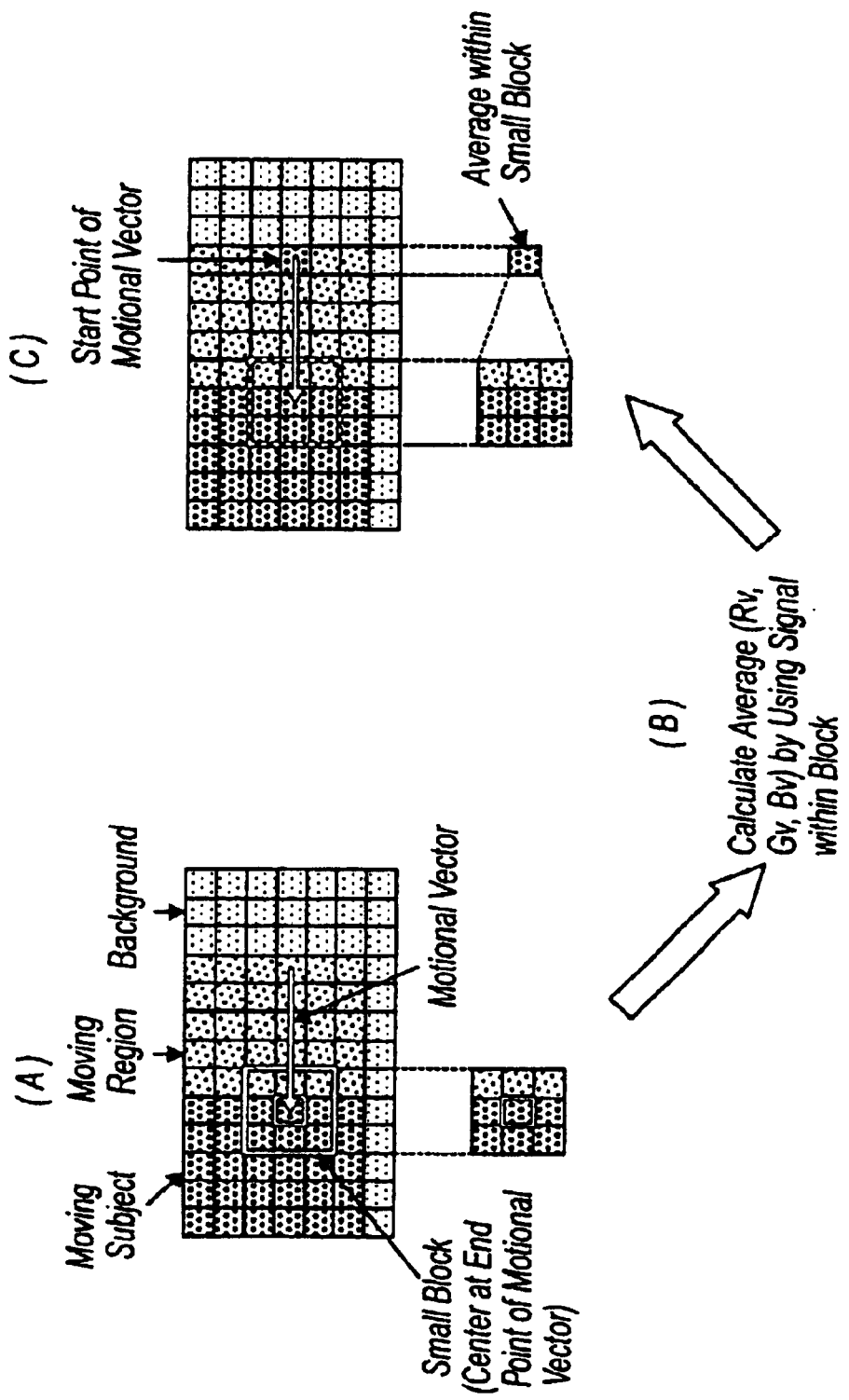
FIG. 6 is a schematic diagram explaining the operation of the image synthesizing circuit shown in FIG. 5.

To the vector pixel interpolating unit 60 is also supplied the gain adjusted image signal pp picked-up with a smaller exposure amount, and as depicted by (C) in FIG. 6, in order to remove a moving object into an original position, a pixel signal of the synthetic unsuitable pixel at the start point of the motional vector is interpolated by the small block average signal aaa. The pixel signal of the synthetic unsuitable region including the end point of the motional vector is interpolated by the pixel signal of a corresponding region of the gain adjusted image signal pp. A synthesized corrected image signal bbb is supplied to the low pass filter 61. In the low pass filter 61, the synthesized corrected image signal bbb is subjected to the low pass filtering treatment by using the synthesized image signal qq from the image synthesizing unit 51 like as the first embodiment to derive the synthesized image signal ff.

Figure 7:
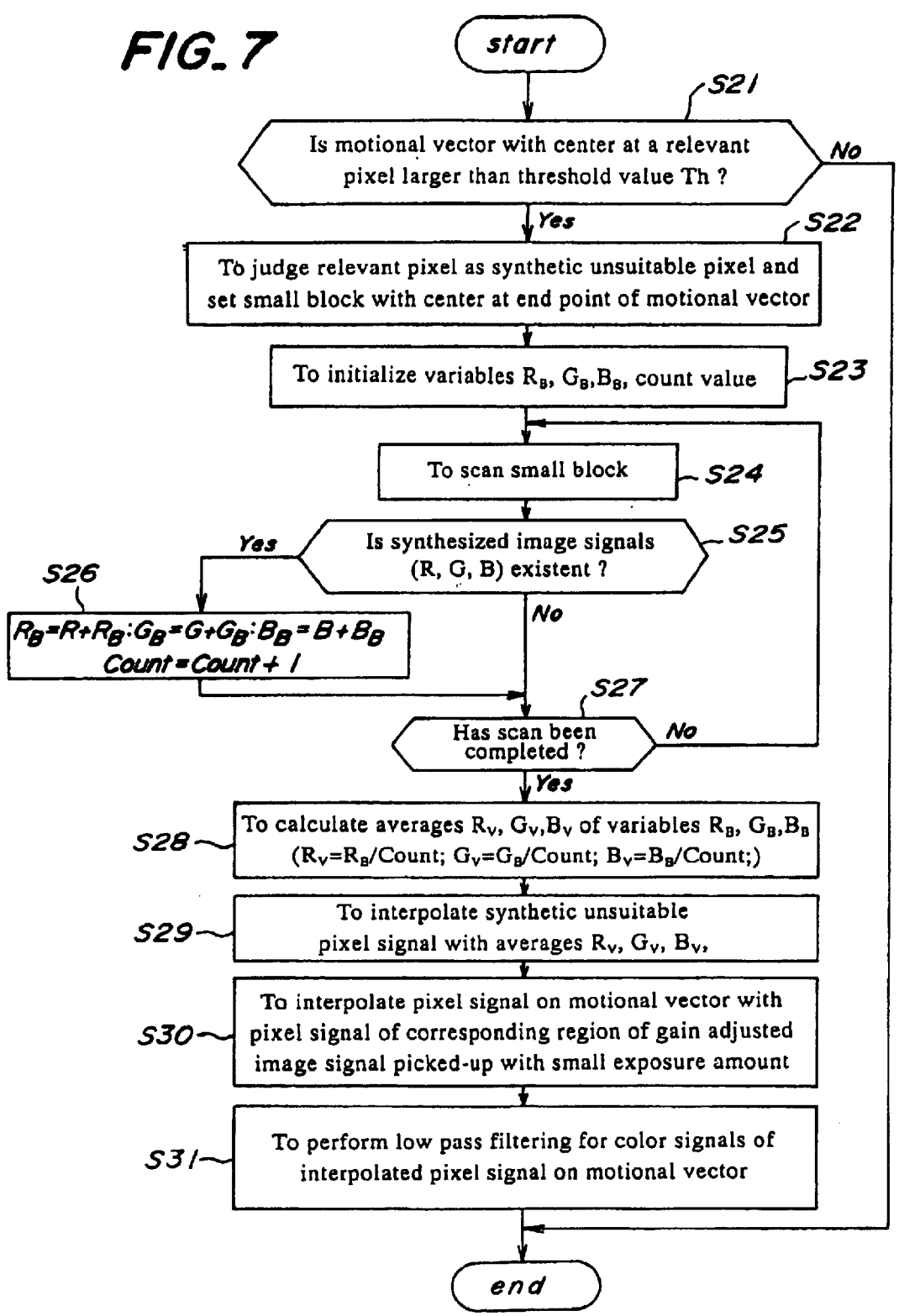
FIG. 7 is a flow chart denoting the operation of major parts of the image synthesizing circuit illustrated in FIG. 5.

FIG. 7 is a flow chart representing the interpolating operation for a pixel signal of synthetic unsuitable pixels by means of the small block setting unit 58, small block average calculating unit 59, vector pixel interpolating unit 60 and low pass filter 61 shown in FIG. 5. At first, in the small block setting unit 58, it is judged whether or not the motional vector having a start point corresponding to a relevant pixel exceeds the predetermined threshold value (step S21). When the vector exceeds the threshold value, the relevant pixel is judged to be a synthetic unsuitable pixel, and a small block having a size of 3×3 pixels such that said small has a center corresponding to an end point of the motional vector in accordance with the synthesized image signal qq from the image synthesizing unit 51 (step S22). Then, the small block set signal zz is supplied to the small block average calculating unit 59.

In the small block average calculating unit 59, in response to the small block set signal zz, variables ($R_B$, $G_B$, $B_B$) of color signals and a count value (Count) of an inside counter counting the number of adding operations are initialized (step S23), and while the small block is scanned (step S24), it is judged whether or not the synthesized pixel signals (R, G, B) are existent within the small block (step S25). When the synthesized pixel signals are existent, the relevant synthesized pixel signals are added to corresponding variables and the count values are incremented by one (step S26). After completing the scanning for all the small block (step S27), averages ($R_V$, $G_V$, $B_V$) of the variables ($R_B$, $G_B$, $B_B$) are calculated by using the count values (Count) (step S28), and the thus calculated average values are supplied to the vector pixel interpolating unit 60 as the small block average signal aaa.

In the vector pixel interpolating unit 60, a pixel signal of a synthetic unsuitable pixel at the start point of the motional vector is interpolated by the small block average signal aaa (step S29), and a pixel signal of the remaining synthetic unsuitable pixel region including the end point of the motional vector is interpolated by a pixel signal of a corresponding region of the gain adjusted image signal pp (step S30). Then, the thus obtained pixel signal is supplied to the low pass filter 61 as the synthesized corrected image signal bbb. In the low pass filter 61, the pixel signal on the motional vector interpolated in accordance with the synthesized image signal qq is subjected to the low pass filtering treatment (step S31) to derive the synthesized image signal ff.

Figure 8:
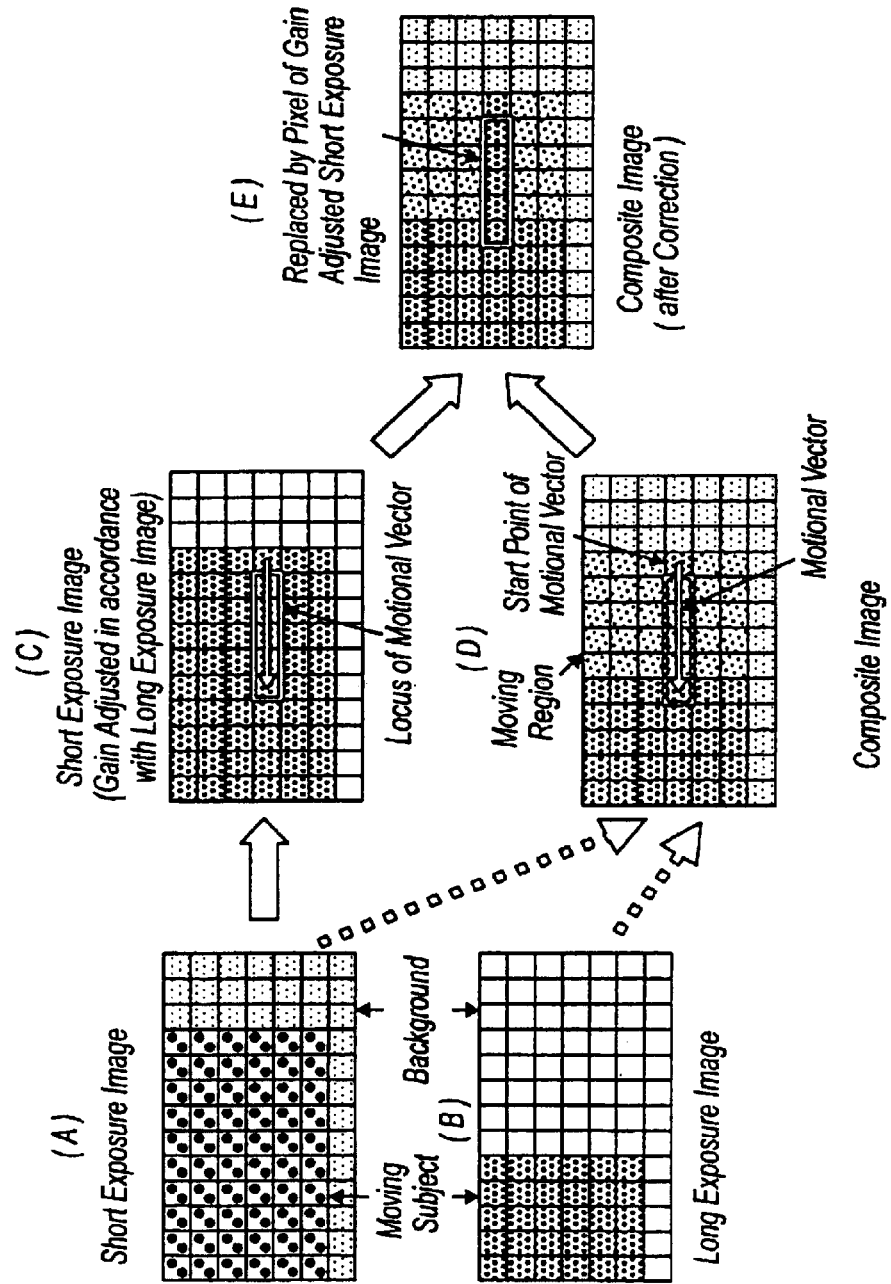
FIGS. 8, 9 and 10 are schematic diagrams explaining the operation of the image synthesizing circuit of FIG. 5.
Figure 9:
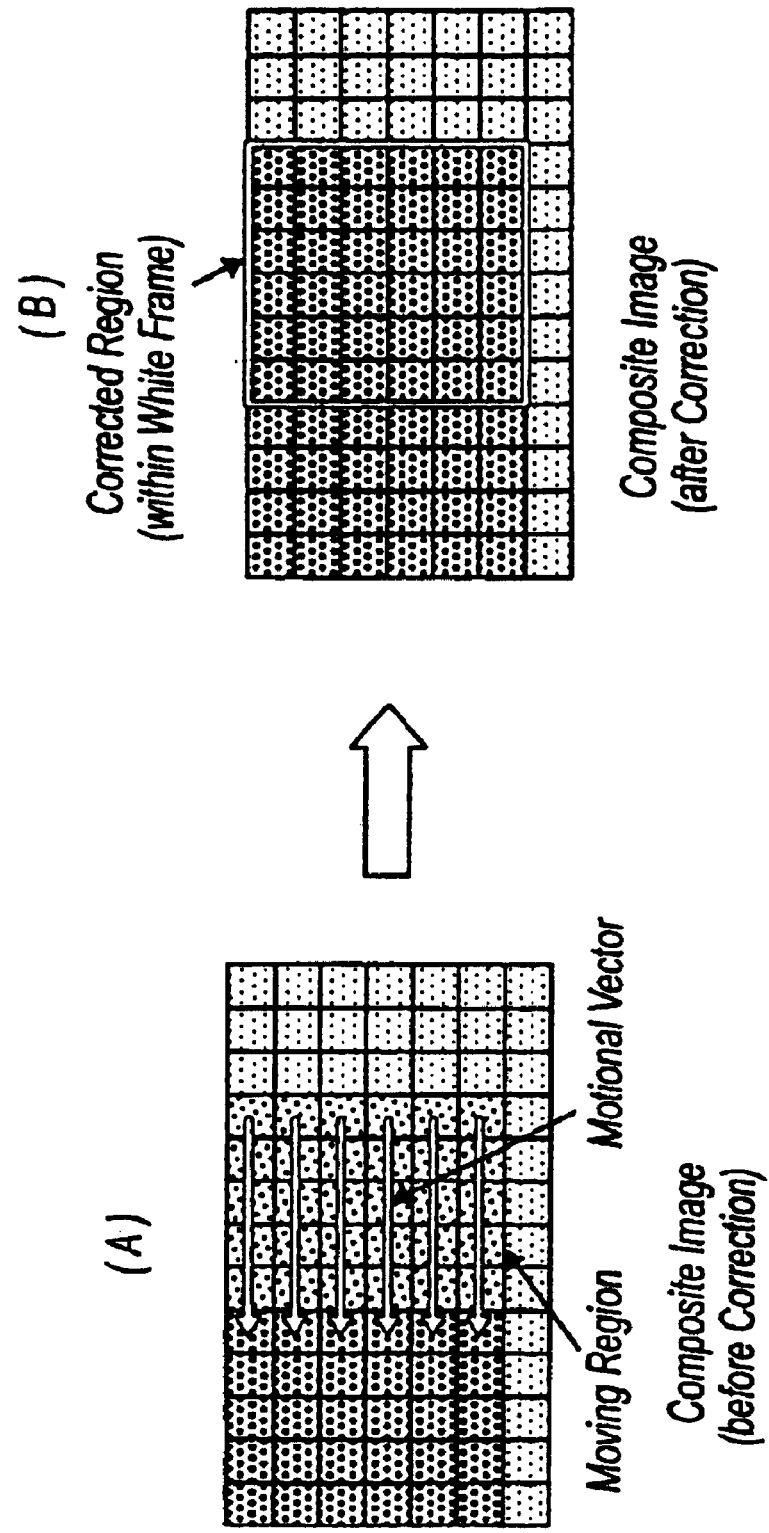

In the second embodiment, in the wide dynamic range picking-up mode, when the image signal dd picked-up with a smaller exposure amount shown by (A) in FIG. 8 and the image signal ee picked-up with a larger exposure amount denoted by (B) in FIG. 8 are derived from the process circuits 31 and 35 (see FIG. 2), respectively, a gain of the image signal picked-up with a shorter exposure time is adjusted such that a level of this image signal is matched with a level of the image signal picked-up with a longer exposure time as illustrated by (C) in FIG. 8. The motional vector is detected from the gain adjusted image signal picked-up with a shorter exposure time and the image signal picked-up with a longer exposure time, and these image signals are synthesized in a partially exchanging manner except for a region in which the detected motional vector exceeds the predetermined threshold value to obtain the synthesized image signal as depicted by (D) in FIG. 8. It should be noted that at this time, the start point of the motional vector shown by (D) in FIG. 8 has not been replaced yet. For respective motional vectors, a pixel signal of a pixel corresponding to a start point of a motional vector is interpolated by an average value of the synthesized image signals within a small block having a center corresponding to an end point of the motional vector as explained above with reference to FIG. 6. By this operation, the start point of the motional vector is replaced by the average value of the synthesized image signals within the small block as shown by (D) in FIG. 8. The pixel signal of the remaining region containing the end point of the motional vector is interpolated by the pixel signal of a corresponding region of the gain adjusted image signal illustrated by a white frame in (C) in FIG. 8. In this manner, it is possible to obtain the corrected synthesized image signal shown in (E) in FIG. 8. Therefore, when the above operation is performed for a plurality of motional vectors shown by (A) in FIG. 9, a corrected synthesized image can be finally obtained as depicted by (B) in FIG. 9.

Figure 10:
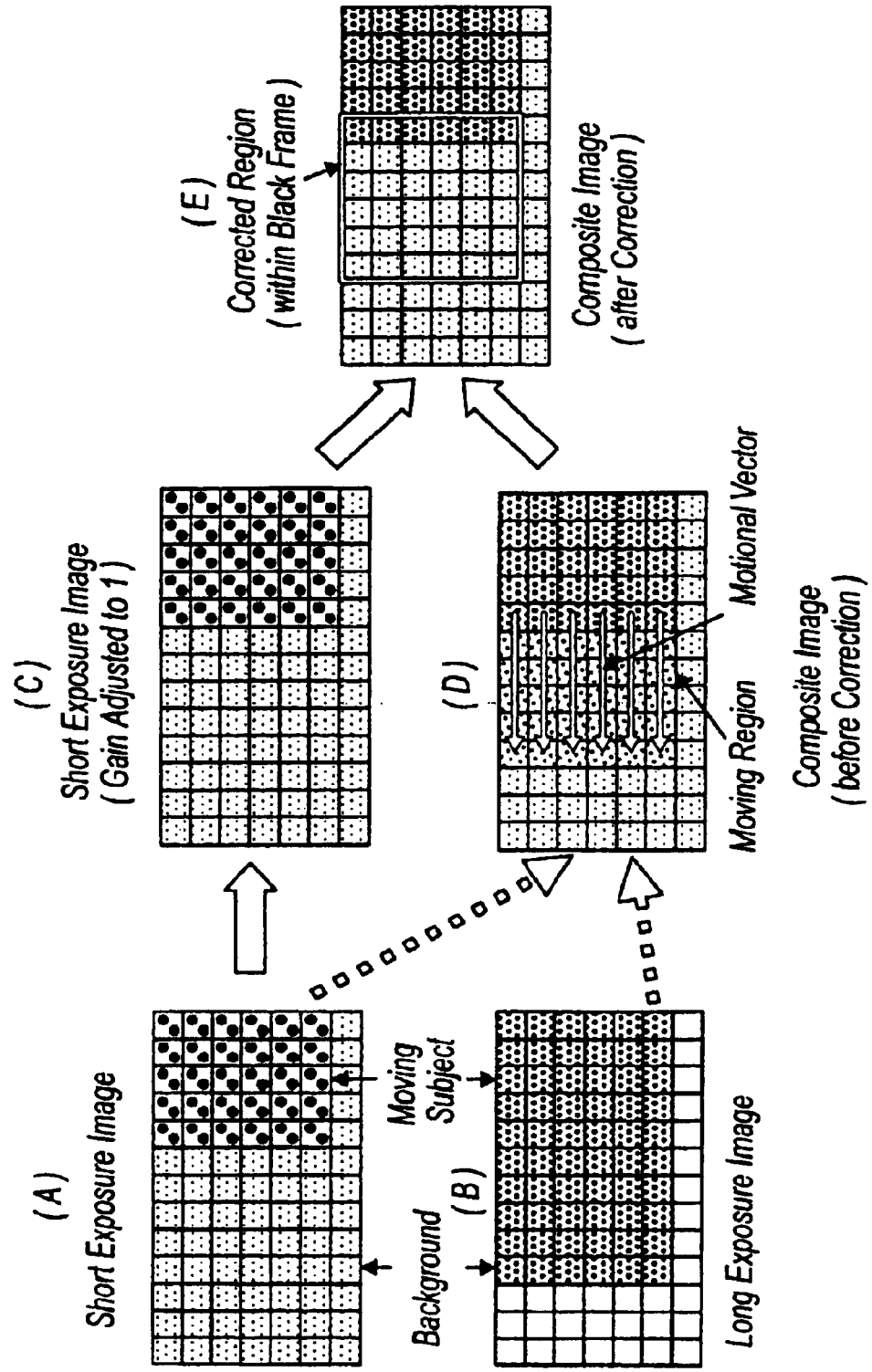

It should be noted that in the above explanation, the pixel signal at a boundary between before and after the movement of the picked-up object is corrected (interpolated), a background may be equally corrected (interpolated). Also in this case, at first, an average value of synthesized image signals within a small block set at an end point of a motional vector is calculated, and a pixel signal at a start point of the motional vector is interpolated in accordance with said average value. In this case, the information of a moving object is dominant in the average value. Next, a pixel signal except for the start point of the motional vector is interpolated by a pixel signal of a corresponding region of the image signal picked-up with a shorter exposure time (corresponding to a smaller exposure amount). Since the information to be interpolated in a background, the gain of the image signal picked-up with a shorter exposure time is multiplied by 1 in order that the background becomes too bright. By performing such an interpolation, only the start point of the motional vector is represented by the moving object and the remaining portion is interpolated by the background. This operation is shown by (A)–(E) in FIG. 10. Since details of this interpolating operation are apparent from the explanations with reference to (A)–(E) in FIG. 8 as well as (A) and (B) in FIG. 9, its explanation is dispensed with.

It should be noted that in the above explained second embodiment, the pixel signal at the start point of the motional vector is interpolated by the average value of the image signals within a small block having a center corresponding to the end point of the motional vector. According to the invention, it is also possible to replace the pixel signal at the start point of the motional vector merely by the pixel signal at the end point of the motional vector.

In a third embodiment of the image pick-up device according to the invention, in the image synthesis processing circuit 32 shown in FIG. 2, upon synthesizing the image signals dd and ee picked-up with different exposure amounts, a difference between these image signals is calculated, and for a pixel region in which an absolute value of said difference exceeds a predetermined threshold value, a motional vector is calculated. When the motional vector exceeds a predetermined value, a relevant pixel is judged to be a synthetic unsuitable pixel. Then a pixel block having a center corresponding to a start point of the motional vector and including an end point of the motional vector is set, relevant synthetic unsuitable pixel, and a pixel signal of a synthetic unsuitable region within the pixel block is replaced by a synthesized image signal of a synthetic suitable region within a pixel block having a center corresponding to the end point of the motional vector and a size identical with said pixel block having a center at the start point of the motional vector. A pixel signal which is lost by the replacement is corrected by a pixel signal of a corresponding region of the gain adjusted image signal picked-up with a small exposure amount.

Figure 11:
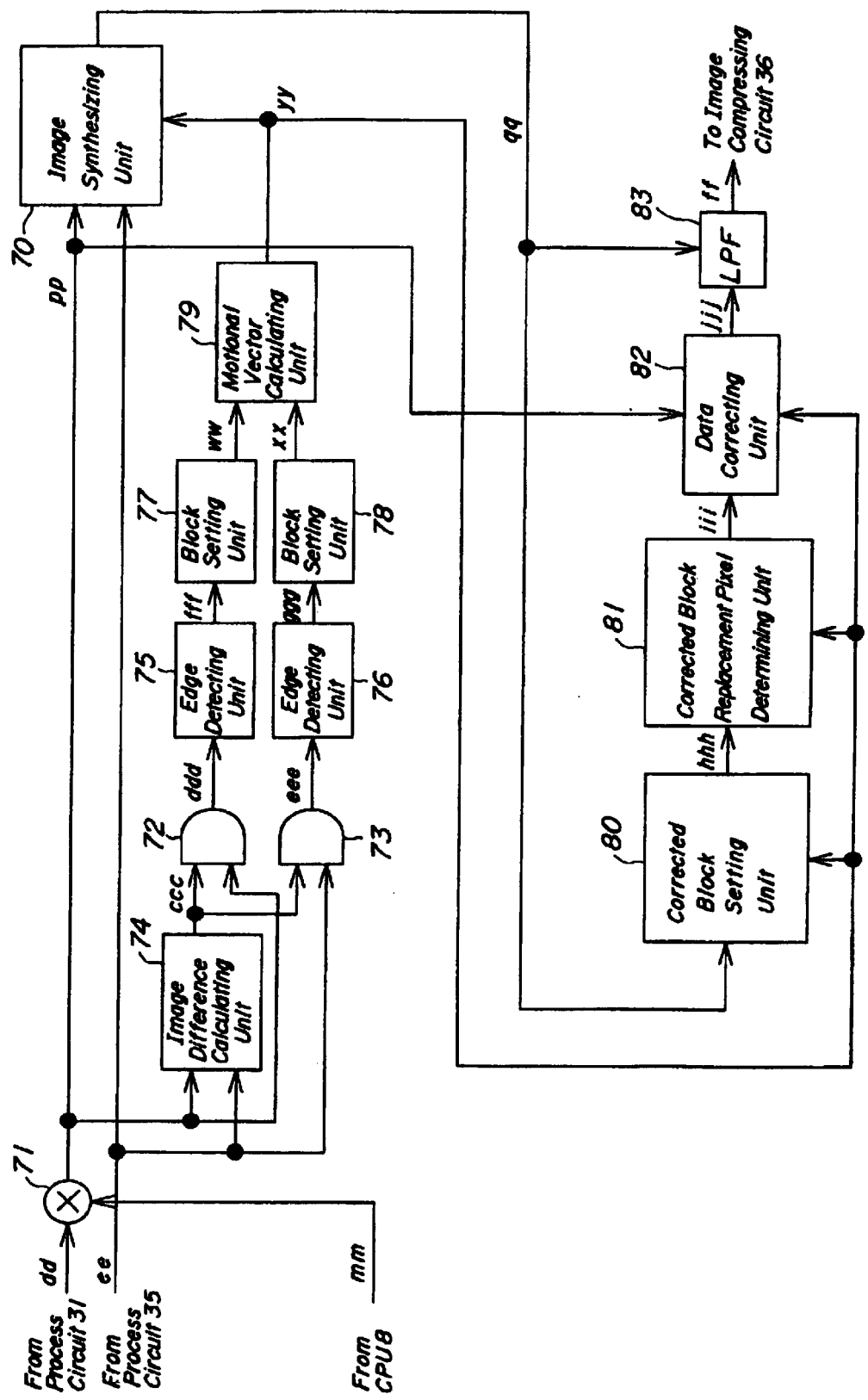
FIG. 11 is a block diagram showing an embodiment of the image synthesizing circuit shown in FIG. 2 in a third embodiment of the image pick-up device according to the invention.

FIG. 11 is a block diagram showing an embodiment of the image synthesis processing circuit 32 of the third embodiment. In this image synthesis processing circuit 32, the image signal ee picked-up with a larger exposure amount is supplied to one input of an image synthesizing unit 70, and the image signal dd picked-up with a smaller exposure amount is supplied to a multiplier 71, in which a gain of the image signal is amplified by the exposure amount ratio in accordance with the exposure amount ratio data signal mm from the CPU 8. Then, the gain adjusted image signal pp is supplied to the other input of the image synthesizing unit 70. The image signals pp and ee are supplied to AND gates 72 and 73, respectively as well as to an image difference calculating unit 74. In the image difference calculating unit 74, differences between the image signals pp and ee are calculated on a pixel by pixel basis, i.e. at corresponding pixel positions, and absolute values of the differences are compared with a predetermined threshold value. When an absolute value of a difference exceeds the threshold value, a logic "1" is derived, and when an absolute value of a difference is not larger than the threshold value, a logic "0" is produced as a comparison result logic data signal ccc. This comparison result logic data signal ccc is supplied to the other inputs of the AND gates 72 and 73. Then, the AND gate 72 generates an image signal ddd of a region in which the absolute value of the difference between the image signals pp and ee exceeds the threshold value among the gain adjusted image signal pp, and the AND gate 73 generates an image signal eee of a region in which the absolute value of the difference between the image signals pp and ee exceeds the threshold value among the image signal ee.

The image signals ddd and eee generated from the AND gates 72 and 73 are supplied to edge detecting units 75 and 76, respectively and edge detection signals fff and ggg are supplied to block setting units 77 and 78, respectively to produce block signals ww and xx. These block signals ww and xx are supplied to a motional vector calculating unit 79, in which a motional vector is calculated on the basis of the block signals ww and xx to derive a motional vector data signal yy. The thus obtained motional vector data signal yy is supplied to the image synthesizing unit 70, corrected block setting unit 80, corrected block replacement pixel determining unit 81 and data correcting unit 82.

In the image synthesizing unit 70, like as the second embodiment, the motional vector data signal yy is compared with a predetermined threshold value, and the motional vector data signal yy is not larger than the threshold value, a relevant pixel is judged to be a synthetic suitable pixel. Then, corresponding pixels of the gain adjusted image signal pp picked-up with a smaller exposure amount and the image signal ee picked-up with a larger exposure amount are combined by performing the exchange in a mosaic manner explained with reference to FIG. 13. When the motional vector data signal yy exceeds the predetermined threshold value, a relevant pixel is judged as a synthetic unsuitable pixel, and the image synthesis by the exchange is not carried out. In this manner, the image synthesizing unit 70 derives the synthesized image signal qq, in which pixels other than synthetic unsuitable pixels are synthesized in a mosaic manner, and this synthesized image signal qq is supplied to the corrected block setting unit 80 and low pass filter (LPF) 83.

Figure 12:
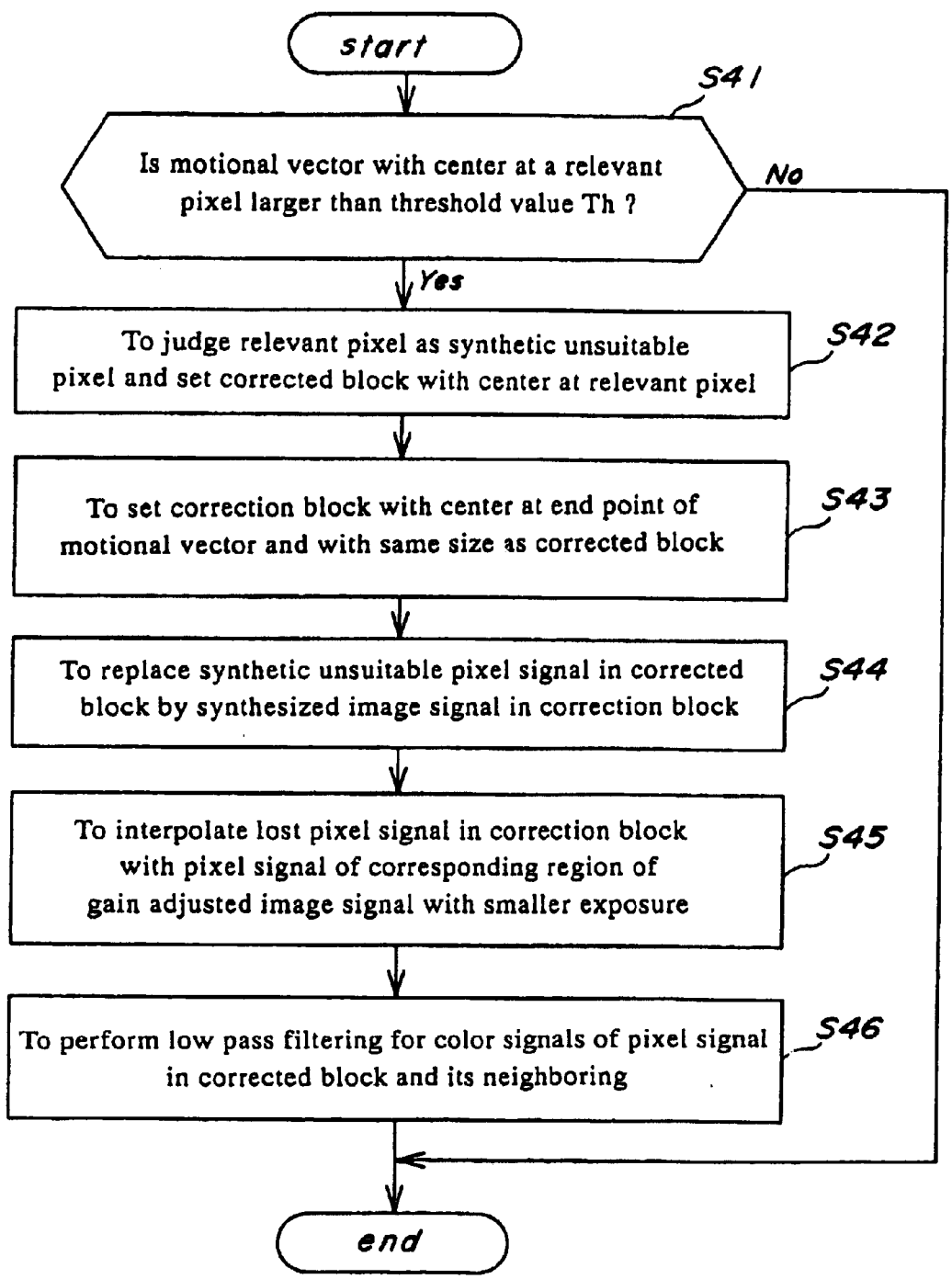
FIG. 12 is a flow chart representing the operation of major parts of the image synthesizing circuit shown in FIG. 11.

In the corrected block setting unit 80, also represented by a flow chart shown in FIG. 12, a motional vector data signal yy having a start point corresponding to a pixel under consideration is compared with a predetermined threshold value Th (step S41). Only when the motional vector data signal yy exceeds the threshold value Th, the relevant pixel is judged as a synthetic unsuitable pixel, and a corrected block is set by a similar calculation for deriving the motional vector such that said block has a center corresponding to a start point of the motional vector and includes an end point of the motional vector (step S42). A corrected block set signal hhh (including the information of the synthesized image signal qq) is supplied to the corrected block replacement pixel determining unit 81.

In this corrected block replacement pixel determining unit 81, a correction block having the same size as the corrected block and having a center corresponding to the end point of the motional vector in accordance with the corrected block set signal hhh and motional vector data signal yy (step S43). A correction block set signal iii (including the information of the synthesized image signal qq) is supplied to the data correcting unit 82.

To the data correcting unit 82 is also supplied the gain adjusted image signal pp, and a pixel signal of a synthetic unsuitable pixel is replaced by the synthesized image signal within the correction block in accordance with the correction block set signal iii and motional vector data signal yy (step S44). A pixel signal of the relevant region which has been lost by the replacement is obtained by performing the interpolation in accordance with a pixel signal of a corresponding region of the gain adjusted image signal pp picked-up with a smaller exposure amount (step S45). In this manner, a synthesized corrected image signal jjj is obtained and is supplied to the low pass filter 83. In the low pass filter 83, the pixel signal within the corrected block as well as the pixel signal in a region surrounding the corrected block are subjected to the low pass filtering treatment for respective color signals (step S46) to derive the synthesized image signal ff.

In the third embodiment, the pixel signal of the synthetic unsuitable region within the corrected block is replaced by the synthesized image signal of the synthetic suitable region within the correcting block, but according to the invention, the interpolation may be utilized instead of the replacement or substitution. Then, no pixel signal is lost within the correcting block and it is no more necessary to perform the above mentioned interpolation for the lost pixel signal. In this manner, the process can be simplified.

The present invention also provide a computer readable record medium, having a program recorded thereon, wherein said program is to make a computer execute the procedure for controlling an operation of the image pick-up device in the dynamic range image picking-up mode in the manner explained above in the various embodiments and possible alternations thereof. By setting such a record medium on a suitable driver installed in or connected to the image pick-up device and reading the program into the CPU 8 (FIG. 1) in the image pick-up device, the above explained process can be performed.

As explained above, according to the present invention, upon synthesizing a plurality of image signals picked-up with different exposure amounts in a partially exchanging manner to derive a synthesized image signal having a wide dynamic range, a synthetic unsuitable region in the image signals is detected and a pixel signal of such a synthetic unsuitable region is corrected. Therefore, the influence of the movement of a subject on a bright background during successive picking-up operations upon the synthesizing of the image signals can be minimized, and it is possible to obtain an image having a wide dynamic range which does not cause any feeling of strangeness as compared with a conventional photographic image.

What is claimed is:

1. An image pick-up device for producing a synthesized image signal having a wide dynamic range by partially combining a plurality of images picked-up with different exposure amounts comprising:

an image picking-up means including a solid state image sensing element and picking-up an object by a plurality of times with different exposure amounts to derive a plurality of image signals;

a memory means for storing at least a part of said plurality of image signals derived successively from said image picking-up means;

an image synthesizing means for synthesizing said plurality of image signals at least a part of which is read out of said memory means to derive a synthesized image signal;

a synthetic unsuitable portion detecting means for detecting a synthetic unsuitable portion in said plurality of image signals which is not suitable for synthesizing, said synthetic unsuitable portion detecting means being constructed such that a difference between a plurality of image signals picked-up with different exposure amounts is calculated, and a synthetic unsuitable portion is detected on the basis of said difference; and a correcting means for correcting a pixel signal of said synthetic unsuitable portion detected by said detecting means to derived a corrected pixel signal.

2. An image pick-up device for producing a synthesized image signal having a wide dynamic range by partially combining a plurality of images picked-up with different exposure amounts comprising:

an image picking-up means including a solid state image sensing element and picking-up an object by a plurality of times with different exposure amounts to derive a plurality of image signals;

a memory means for storing at least a part of said plurality of image signals derived successively from said image picking-up means;

an image synthesizing means for synthesizing said plurality of image signals at least a part of which is read out of said memory means to derive a synthesized image signal;

a synthetic unsuitable portion detecting means for detecting a synthetic unsuitable portion in said plurality of image signals which is not suitable for synthesizing, said synthetic unsuitable portion detecting means being constructed such that a motional vector is calculated on the basis of a comparison of the plurality of image signals picked-up with different exposure amounts, and a synthetic unsuitable portion is detected on the basis of a magnitude of said motional vector; and a correcting means for correcting a pixel signal of said synthetic unsuitable portion detected by said detecting means to derived a corrected pixel signal.

3. An image pick-up device as claimed in claim 2, wherein said synthetic unsuitable portion correcting means is constructed such that a pixel signal within a synthetic unsuitable portion is corrected in accordance with a synthesized pixel signal of a portion which situates in a portion which is not detected as the synthetic unsuitable portion, but is in a vicinity of the synthetic unsuitable portion.

4. An image pick-up device as claimed in claim 2, wherein said synthetic unsuitable portion correcting means is constructed such that a pixel signal of the synthetic unsuitable portion including a start point of the motional vector is corrected by a synthesized pixel signal in a portion including an end point of said motional vector and being excluded from said synthetic unsuitable portion, and a pixel signal of the synthetic unsuitable portion in a remaining region within the pixel block including the end point of the motional vector is corrected in accordance with an image signal of a corresponding region of one of said plurality of image signals.

5. An image pick-up device as claimed in claim 2, wherein said synthetic unsuitable portion correcting means is constructed such that a pixel signal of the synthetic unsuitable portion within a pixel block which has a center at a start point of said motional vector and contains an end point of said motional vector is corrected in accordance with a synthesized image signal of a synthetic suitable portion within a pixel block which has a center at the end point of said motional vector and has a same size as said pixel block having a center at the start point of the motional vector.

6. An image pick-up device as claimed in claim 2, wherein said synthetic unsuitable portion detecting means is constructed such that a difference between said plurality of image signals picked-up with different exposure amounts is calculated, and a motional vector is derived only for a pixel region in which an absolute value of said difference is not less than a predetermined value.

7. An image pick-up device as claimed in claim 6, wherein said synthetic unsuitable portion correcting means is constructed such that a pixel signal within a synthetic unsuitable portion is corrected in accordance with a synthesized pixel signal of a portion which situates in a portion which is not detected as the synthetic unsuitable portion, but is in a vicinity of the synthetic unsuitable portion.

8. An image pick-up device as claimed in claim 6, wherein said synthetic unsuitable portion correcting means is constructed such that a pixel signal in the synthetic unsuitable portion including a start point of the motional vector is corrected by a synthesized pixel signal in a portion including an end point of said motional vector and being excluded from said synthetic unsuitable portion, and a pixel signal of the synthetic unsuitable portion in a remaining region within the pixel block including the end point of the motional vector is corrected in accordance with an image signal of a corresponding region of one of said plurality of image signals.

9. An image pick-up device as claimed in claim 6, wherein said synthetic unsuitable portion correcting means is constructed such that a pixel signal of the synthetic unsuitable portion within a pixel block which has a center at a start point of said motional vector and contains an end point of said motional vector is corrected in accordance with a synthesized image signal of a synthetic suitable portion within a pixel block which has a center at the end point of said motional vector and has a same size as said pixel block having a center at the start point of the motional vector.

10. An image pick-up device as claimed in claim 1, wherein said storing means stores two image signals picked-up with different exposure amounts.

11. An image pick-up device as claimed in claim 10, wherein said image synthesizing means is constructed to derive said synthesized image signal by partially exchanging the two image signals in a mosaic manner.

12. An image pick-up device as claimed in claim 11, wherein said combining means includes a low pass filter for low pass filtering said synthesized corrected image signal derived from said synthetic unsuitable portion correcting means in accordance with said synthesized image signal from said image synthesizing means.

13. An image pick-up device as claimed in claim 2, wherein said storing means stores two image signals picked-up with different exposure amounts.

14. An image pick-up device as claimed in claim 13, wherein said image synthesizing means is constructed to derive said synthesized image signal by partially exchanging the two image signals in a mosaic manner.

15. An image pick-up device as claimed in claim 14, wherein said combining means includes a low pass filter for low pass filtering said synthesized corrected image signal derived from said synthetic unsuitable portion correcting means in accordance with said synthesized image signal from said image synthesizing means.

* * * * *